United States Patent Office 3,528,971
Patented Sept. 15, 1970

3,528,971
CYCLOALKYL NITROFURYL NITRONES
Ronald E. Bambury and Hyun Koo Kim, Ashland, Ohio, assignors to Richardson-Merrell Inc., New York, N.Y., a corporation of Delaware
No Drawing. Filed July 5, 1968, Ser. No. 742,525
Int. Cl. C07d 5/30
U.S. Cl. 260—240
9 Claims

ABSTRACT OF THE DISCLOSURE

Novel compounds of the formula

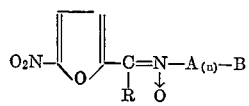

wherein: $n$ is 0 or 1; A is (lower) alkylene; R is hydrogen or (lower) alkyl; and B is (a) cycloalkyl of 4 to 8 ring carbon atoms, (b) (lower) alkylcycloalkyl wherein the cycloalkyl has 4 to 8 ring carbon atoms, (c) (lower) hydroxyalkylcycloalkyl wherein the cycloalkyl has 4 to 8 ring carbon atoms, or (d) hydroxycycloalkyl of 4 to 8 ring carbon atoms in the cycloalkyl group. The compounds of this invention have antibacterial, antifungal, and antiprotozoan activity.

---

This invention relates to novel cycloalkyl nitrofuryl nitrones of the above formula which have antibacterial, antifungal and antiprotozoan activity.

Preferably, R in the above formula is hydrogen; $n$ is 0, i.e., A is simply a covalent bond connecting the nitrogen with the group B; and B is unsubstituted cycloalkyl, e.g., cyclohexyl.

When $n$ is 1, the saturated aliphatic hydrocarbon group as represented by A in the above formula can be straight or branched chain divalent alkylene having from 1 to 3 carbon atoms, for example, divalent methylene, divalent ethylene or divalent propylene.

When B of the above formula is an unsubstituted cycloalkyl group it can be cyclobutyl, cyclopentyl, cyclohexyl, cycloheptyl, or cyclooctyl.

R can be a (lower) alkyl or hydrogen. Preferably, R is hydrogen.

The term "(lower)" as used herein to refer to alkyl, hydroalkyl, or alkylene groups refers to such groups having from 1 to 3 carbon atoms.

Illustrative of the (lower) alkyl groups as can be represented by R or (lower) alkyls attached to a cycloalkyl group, there can be mentioned methyl, ethyl and propyl.

Illustrative of (lower) alkylcycloalkyl groups there can be mentioned: 2-methylcyclohexyl; 3-methylcyclohexyl; 4-methylcyclohexyl; 2-ethylcyclohexyl; 2-methylcycloheptyl; 4-ethylcyclooctyl; 2-methylcyclobutyl and 2-propylcyclopentyl.

The (lower) hydroxyalkylcycloalkyl groups can have the hydroxyalkyl substituted in any of the positions of the cycloalkyl group. The (lower) hydroxyalkyl can be that of hydroxymethyl, hydroxyethyl or hydroxypropyl. Illustrative of the (lower) hydroxyalkylcycloalkyl groups there can be mentioned: 1-hydroxymethylcyclohexyl; 1-hydroxymethylcyclobutyl; 2-hydroxymethylcyclopentyl; 3-hydroxyethylcycloheptyl; and the like.

Illustrative of novel compounds of this invention there can be mentioned:

α-(5-nitro-2-furyl)-N-cyclobutylnitrone;
α-(5-nitro-2-furyl)-N-cyclopentylnitrone;
α-(5-nitro-2-furyl)-N-cyclohexylnitrone;
α-(5-nitro-2-furyl)N-cycloheptylnitrone;
α-(5-nitro-2-furyl)-N-cyclooctylnitrone;
α-(5-nitro-2-furyl)-N-(cyclobutylmethyl)nitrone;
α-(5-nitro-2-furyl)-N-(2-cyclopentylethyl)nitrone;
α-(5-nitro-2-furyl)-N-(cyclohexylmethyl)nitrone;
α-(5-nitro-2-furyl)-N-(3-cycloheptylpropyl)nitrone;
α-(5-nitro-2-furyl)-α-methyl-N-cyclohexylnitrone;
α-(5-nitro-2-furyl)-N-(2-methylcyclohexyl)nitrone;
α-(5-nitro-2-furyl)-N-(2-propylcyclohexyl)nitrone;
α-(5-nitro-2-furyl)-N-(4-propylcyclohexyl)nitrone;
α-(5-nitro-2-furyl)-α-methyl-N-(1-methylcyclohexyl) nitrone;
α-(5-nitro-2-furyl)-N-(2-methylcycloheptyl)nitrone;
α-(5-nitro-2-furyl)-N-(1-methylcyclopentyl)nitrone;
α-(5-nitro-2-furyl)-N-(2-hydroxycyclobutyl)nitrone;
α-(5-nitro-2-furyl)-N-(2-hydroxycyclopentyl)nitrone;
α-(5-nitro-2-furyl)-N-(2-hydroxycyclohexyl)nitrone;
α-(5-nitro-2-furyl)-N-(4-hydroxycyclohexyl)nitrone;
α-(5-nitro-2-furyl)-N-(3-hydroxycycloheptyl)nitrone;
α-(5-nitro-2-furyl)-N-[(1-hydroxycyclohexyl)methyl] nitrone;
α-(5-nitro-2-furyl)-N-[2-(2-hydroxycyclopentyl)ethyl] nitrone;
α-(5-nitro-2-furyl)-N-(1-hydroxymethylcyclohexyl) nitrone;
α-(5-nitro-2-furyl)-N-[2-(2-hydroxyethyl)cyclobutyl] nitrone;
α-(5-nitro-2-furyl)-N-[4-(2-hydroxyethyl)cyclohexyl] nitrone; and
α-(5-nitro-2-furyl)-N-[(1-hydroxycyclohexyl)methyl] nitrone.

The nitrones of this invetnion are prepared by contacting a substituted 5-nitrofuran, Formula II below, with a substituted hydroxylamine, Formula III below, to produce the nitrones of this invention as shown by Formula I and as can be illustrated by the following reaction scheme:

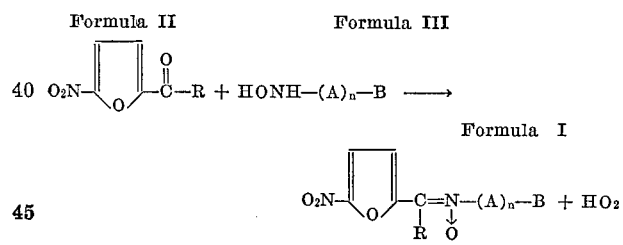

wherein R, $(A)_n$ and B have the same meaning as given hereinbefore, i.e., R is hydrogen or (lower) alkyl, i.e., alkyl of 1 to 3 carbon atoms, A is (lower) alkylene, $(n)$ is 0 or 1, and B is (a) cycloalkyl having 4 to 8 ring carbon atoms, (b) lower alkyl cycloalkyl wherein the cycloalkyl has 4 to 8 ring carbon atoms, (c) lower hydroxyalkylcycloalkyl wherein the cycloalkyl has 4 to 8 ring carbon atoms, or (d) hydroxycycloalkyl having from 4 to 8 ring carbon atoms in the cycloalkyl group.

The hydroxylamine reactant of Formula III, or an acid addition salt thereof, about one-half to three molar equivalents, is mixed with one molar equivalent of the nitrofuran reactant (Formula II) in an inert organic solvent such as an alcohol, benzene, toluene, dioxane, chloroform, methylene chloride, carbon tetrachloride, ether and the like, to produce the product of Formula I. The temperature of the reaction mixture is maintained at about $-10°$ C. to $+150°$ C. and preferably at about 15° C. to 100° C. for about 0.1 to 48 hours. The course of the reaction may be followed by standard analytical techniques such as gas liquid chromatography, ultraviolet absorption, thin layer chromatography, nuclear magnetic resonance, and the like, so that the reaction mixture can be worked up when the concentration of the desired nitrone reaches a maximum.

In some cases the use of a Dean-Stark type water separation apparatus is useful in the promotion of the completion of the reaction by removal of the water which is formed. Alternatively, an inorganic drying agent (e.g., magnesium sulfate, sodium sulfate, etc.) or molecular sieves may be used for the same purpose. When the acid addition salt of the hydroxyamine reactant is used, one can advantageously use a mild base such as sodium bicarbonate, potassium bicarbonate, sodium acetate, and the like, to control the pH of the reaction mixture between about 4 and 10.

After the reaction is complete the nitrone can be recovered from the reaction mixture by the usual techniques (filtration, evaporation of the solvent, distillation, trituration, etc.) and can usually be further purified by recrystallization.

The hydroxylamine reactant of Formula III $$[HOHN—(A)_n—B]$$

used to prepare the nitrones of this invention can be prepared by the standard methods employed in making such compounds, such as reduction of the corresponding nitro compound, reduction of oximes, hydrolysis of nitrones, oxidation of amines, etc. Such methods are described by Peter A. S. Smith, The Chemistry of Open-Chain Organic Nitrogen Compounds, volume II, Chapter 8, published by W. A. Benjamin, Inc., New York (1966). Illustrative of hydroxylamine reactants there can be mentioned: cyclohexylhydroxylamine, cyclobutylhydroxylamine, 4 - hydroxycyclohexylhydroxylamine, 2-hydroxycyclopentylethylhydroxylamine, 2-methylcyclohexylhydroxylamine, and 4-(2-hydroxyethyl)cyclohexylhydroxylamine.

The novel nitrones of this invention can be used for the destruction or inhibition of gram negative bacteria, gram positive bacteria, fungi, and protozoa. In this regard, it has been found that the nitrones of this invention had greater activity than corresponding compounds having an aliphatic alkyl instead of the cycloaliphatic group, e.g., when $A_{(n)}B$ of the preceding Formula I is cycloheptyl, the compound exhibits activity, in the above mentioned biological areas, greater than the corresponding heptyl compound. For such use they can be used as disinfectant compositions or can be administered to animals, e.g., in conventional unit dosage forms or in the feed of veterinary animals such as chickens.

The nitrones of this invention can be employed as the active antibacterial and antifungal agent of disinfectant compositions for the control of microorganisms such as: *Salmonella typhimurium; Salmonella gallinarium; Escherichia coli; Bacillus subtilis; Staphylococcus aureus; Streptococcus agalactiae; Pasteurella multocida; Erysipelothrix rhusiopathiae; Candida albicans; Aspergillus fumigatus;* and the like. For disinfectant use, e.g., disinfection of surgical instruments, animal watering troughs, animal cages, etc., the nitrones of this invention can be dispersed in an inert finely divided solid and employed as a dust in concentrations of about 0.001% to 5%, preferably about 0.01% to 3% by weight of inert finely divided solids; or they can be dispersed in water or oil with or without a wetting, dispering or emulsifying agent in concentrations which can vary over a wide range such as that of about 0.001% to 5%, preferably about 0.1% to 3% by weight of the liquid composition to prepare germicidal suspensions or emulsion which can be used, e.g., by spraying or dipping, to inhibit the growth of microorganisms.

For in vivo use in the inhibition of bacteria, or protozoa, the compounds of this invention can be administered to animals, e.g., warm blooded animals, in quantities varying from about 20 to 200 mg./kg. of animal weight per day. Administration can be by conventional routes such as parenterally or orally, e.g., in tablets, capsules or in admixtures with the animal's water or feed. When admixed with animal feed or water, the concentration of the compounds of this invention can vary from about 0.001% to 0.05% by weight of the animal's water or feed.

Oral unit dosage forms can include tablets, capsules, powder packets, liquid suspensions, etc. Such dosages can contain from about 50 mg. (milligrams) to 500 or more mg. of the novel nitrone together with conventional carriers, e.g., lactose, corn starch, gelatin, peanut oil, and the like.

The following examples are illustrative of the invention.

EXAMPLE 1

Preparation of α-(5-nitro-2-furyl)-N-cyclohexylnitrone

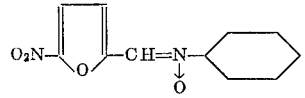

A mixture of 5-nitrofurfural (1.41 g., 0.01 mole) and N-cyclohexylhydroxylamine (1.15 g., 0.01 mole) in dry benzene (50 ml.) was refluxed for 45 minutes, using a Dean-Stark water separator. The solvent was removed in vacuo and the residue was then triturated with petroleum ether (B.P. 60–70° C.) to yield, (2.30 g., 97%) M.P. 149–150° C. Recrystallization from a mixture of benzene and ether (1:7) afforded a light yellow solid, (1.80 g., 76%), M.P. 150–151° C. of the subject compound.

*Analysis.*—Calcd. for $C_{11}H_{14}N_2O_4$ (percent): C, 55.45; H, 5.92; N, 11.76. Found (percent): C, 55.51; H, 5.89; N, 11.94.

EXAMPLE 2

Preparation of α-(5-nitro-2-furyl)-N-cyclopentylnitrone

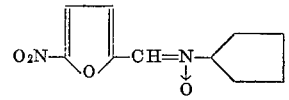

This compound was prepared by reacting 5-nitrofurfural with an equimolar amount amount of N-cyclopentylhydroxylamine as described in Example 1. Recrystallization from ether gave bright yellow crystals, (1.53 g., 68%), M.P. 105–106° C. of the subject compound.

*Analysis.*—Calcd. for $C_{10}H_{12}N_2O_4$ (percent): C, 53.56; H, 5.40; N, 12.50. Found (percent): C, 53.59; H, 5.41; N, 12.44.

EXAMPLE 3

Preparation of α-(5-nitro-2-furyl)-N-cycloheptylnitrone

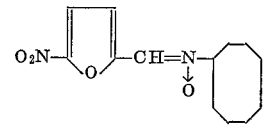

This compound was prepared by reacting 5-nitrofurfural with an equimolar amount of N-cycloheptylhydroxylamine as described in Example 1. Recrystallization from ether gave a bright yellow solid, (1.87 g., 77%), M.P. 133–135° C. of the subject compound.

*Analysis.*—Calcd. for $C_{12}H_{16}N_2O_4$ (percent): C, 57.13; H, 6.39; N, 11.11. Found (percent): C, 57.06; H, 6.41; N, 11.41.

EXAMPLE 4

Preparation of α-(5-nitro-2-furyl)-N-cyclooctylnitrone

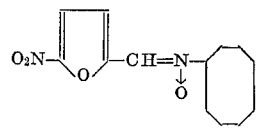

This compound was prepared by reacting 5-nitrofurfural with an equimolar amount of N-cyclooctylhydroxylamine as described in Example 1. Recrystallization from ether gave a bright yellow solid (2.10 g., 86%), M.P. 128–130° C. of the subject compound.

*Analysis.*—Calcd. for $C_{13}H_{18}N_2O_4$ (percent): C, 58.63; H, 6.81; N, 10.52. Found (percent): C, 58.58; H, 6.77; N, 10.39.

EXAMPLE 5

Preparation of α-(5-nitro-2-furyl)-N-(2-methyl-cyclohexyl)-nitrone

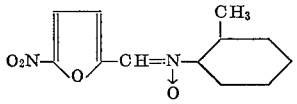

N-(2 - methylcyclohexyl)hydroxylamine hydrochloride (1.66 g., 0.01 mole) in absolute ethanol (10 ml.) was stirred with 5-nitrofurfural (1.41 g., 0.01 mole) in absolute ethanol (10 ml.) containing sodium bicarbonate (0.84 g., 0.01 mole). Stirring was continued for 4 hours and the mixture was filtered, the filter cake was thoroughly washed with ether until no more yellow color remained. Evaporation of the filtrate and ether washings gave a residue which was triturated with cyclohexane, and recrystallized from ether-hexane giving a bright yellow crystalline product of the subject compound (0.48 g., 20%), M.P. 101–103° C.

*Analysis.*—Calcd. for $C_{12}H_{16}N_2O_4$ (percent): C, 57.12; H, 6.39; N, 11.11. Found (percent): C, 57.04; H, 6.69; N, 11.08.

The N - (2 - methylcyclohexyl)hydroxylamine was obtained by reducing 2-methylcyclohexanone oxime (25.4 g., 0.2 mole) with 270.2 ml. of 1 M solution of borane in THF as described in Example 6. Its hydrochloride salt was prepared by treating the hydroxylamine with ethereal hydrochloric acid in an ice bath. After removal of solvent, a hygroscopic solid (23.20 g., 70%) was obtained.

EXAMPLE 6

Preparation of α-(5-nitro-2-furyl)-N-(2-hydroxy-cyclohexyl)-nitrone

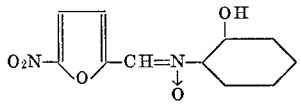

N-(2-hydroxycyclohexyl)hydroxylamine hydrochloride (33.00 g., 0.197 mole) in absolute ethanol (197 ml.) was stirred with 5-nitrofurfural (27.70 g., 0.197 mole) in absolute ethanol (197 ml.) containing sodium bicarbonate (16.55 g., 0.197 mole). Stirring was continued overnight and the mixture was filtered. The filter cake was thoroughly washed with warm ethanol until no more yellow color remained. Evaporation of the filtrate and methanol washings gave a brown solid of the subject nitrone (2.8 g., 6%); M.P. 147–148°.

*Analysis.*—Calcd. for $C_{11}H_4N_2O_5$ (percent): C, 51.96; H, 5.55; N, 11.02. Found (percent): C, 51.85; H, 5.47; N, 10.98.

The N - (2 - hydroxycyclohexyl)hydroxylamine hydrochloride intermediate was prepared as follows: To 2-hydroxycyclohexanone oxime (22.60 g., 0.174 mole) in THF (100 ml.) at 0° was introduced, dropwise, 470 ml. of a 1 M solution of borane in THF, at such a rate that the temperature did not exceed 10°. The reaction mixture was stirred overnight at room temperature, after which the temperature was lowered to 0°. Next, sodium hydroxide solution was added (24 g. of sodium hydroxide pellets in 24 ml. of water) at such a rate that the temperature did not exceed 5°. After refluxing for 1 hour, the reaction mixture was dried over anhydrous magnesium sulfate. The solvent was removed in vacuo to give an oil (26.5 g.), which gave a positive Tollen's test at room temperature. Its hydrochloride salt was prepared by treating the hydroxylamine with ethereal hydrochloric acid. After removal of solvent, a viscous white residue was obtained. It was used for preparation of the nitrone without further purification.

EXAMPLE 7

Preparation of α-(5-nitro-2-furyl)-N-(4-hydroxy-cyclohexyl)-nitrone

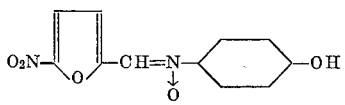

The subject compound was prepared by reacting 5-nitrofurfural with an equimolar amount of N-(4-hydroxycyclohexyl)hydroxylamine hydrochloride in the presence of sodium bicarbonate as described in Example 1.

The N - (4 - hydroxycyclohexyl)hydroxylamine hydrochloride intermediate was prepared in a manner similar to that described for the preparation of N-(2-hydroxycyclohexyl)hydroxylamine, from 4 - hydroxycyclohexanone oxime. Its hydrochloride salt was prepared by treating the crude hydroxylamine with ethereal hydrochloric acid. After removal of solvent, a viscous white residue was obtained. It was used for preparation of the nitrone without further purification.

EXAMPLE 8

Preparation of α-(5-nitro-2-furyl)-N-(1-hydroxy-methyl-cyclohexyl)nitrone

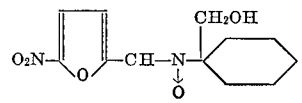

The subject compound was prepared by reacting 5-nitrofurfural with an equimolar amount of 1-hydroxyl-aminocyclohexanemethanol oxalate in the presence of sodium bicarbonate. Recrystallization from methanol gave a bright yellow solid of the subject nitrone.

The 1-hydroxylaminocyclohexane methanol oxalate was prepared as follows: A solution of 1-nitrocyclohexanemethanol (15.92 g., 0.1 mole) in aqueous ethanol (75 ml. of 95% ethanol and 110 ml. of water) containing oxalic acid (5.40 g., 0.06 mole) was hydrogenated at room temperature and one atmosphere pressure in the presence of 10% palladium on charcoal until the calculated amount of hydrogen was absorbed. The reduction mixture was heated to boiling, filtered from the catalyst and the filtrate chilled to give 1-hydroxylaminocyclohexanemethanol oxalate. Recrystallization from absolute ethanol gave a pure sample.

EXAMPLE 9

Preparation of α-(5-nitro-2-furyl)-N-[(1-hydroxy-cyclohexyl)-methyl]nitrone

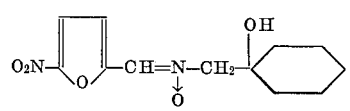

The subject compound was prepared by treating 5-nitrofurfural with an equimolar amount of 1-hydroxyl-aminomethyl-1-cyclohexanol oxalate in the presence of sodium bicarbonate. Recrystallization from ethanol gave a bright yellow solid of the subject nitrone compound in 37% yield, M.P. 122–124°.

The 1-hydroxylaminomethyl-1-cyclohexanol oxalate was prepared as follows: A solution of 1-nitromethyl-1-hydroxycyclohexane (7.16 g., 0.05 mole) in aqueous ethanol (37 ml. of ethanol and 55 ml. of water) containing oxalic acid dihydrate (4.16 g., 0.033 mole) was hydrogenated at one atmospheric pressure and room temperature in the presence of 10% palladium on charcoal (1.0 g.) until the calculated amount of hydrogen was absorbed. The reaction mixture was heated to boiling, filtered from the catalyst and the filtrate chilled to give white, crystalline, 1-hydroxylaminomethyl-1-cyclohexanol oxalate; yield, 6.70 g. (65%), M.P. 144–146°.

EXAMPLE 10

This example shows in vitro activity of one of the compounds of this invention, namely α-(5-nitro-2-furyl)-N-cyclohexylnitrone. The activity was determined by tube dilution technique with tripticase soy broth culture of the microorganism involved. In addition to broth, some of the tubes also contained chicken serum. The results of the tests are shown in the following table, wherein the numbers indicate the minimum concentration of the drug in millionths of a gram per milliliter of contaminated substance, required to inhibit the growth of the organism. The following table shows results with and without the addition of the chicken serum.

|        | SG   | ST  | SA  | SAG | ER  | BS  | EC  | PM  | CA  | AF |
|--------|------|-----|-----|-----|-----|-----|-----|-----|-----|----|
| w/Broth | 100 | 100 | 100 | 10  |     | 10  | 100 |     | 100 | 1  |
| + Serum | >100 | 100 | 100 | 100 | 10  | 10  | 100 | 100 | 100 | 10 |

In the above table the meanings of the abbreviations are as follows: SG for *Salmonella gallinarium*; ST for *Salmonella typhimurium*; SA for *Staphylococcus aureus*; SAG for *Streptococcus agalactiae*; ER for *Erysipelothrix rhusiopathiae*; BS for *Bacillus subtilis*; EC for *Escherichia coli*; PM for *Pasteurella multocida*; CA for *Candida albicans*; and AF for *Aspergillus fumigatus*.

EXAMPLE 11

This example shows in vivo activity of α-(5-nitro-2-furyl)-N-cyclohexylnitrone, also referred to as the Test Drug, by administration of feed containing this nitrone to mice infected with *Salmonella choleraesuis*.

Test mice weighing 19–21 grams were used in the test. Groups of 10 or 15 mice per group were allowed free access to feed containing various quantities of the Test Drug from 0.1% by weight of the feed to 0.0063%. The mice are then injected intraperitoneally with 0.2 ml. of a 1:100,000 dilution of a five-hour *Salmonella choleraesuis* subspecies kunzendorf (ATCC #12011) brain heart infusion broth culture. Mortality records were maintained for 14 days' post-infection with the mice receiving the designated test feed containing the Test Drug throughout this period. At the completion of the test, percent survival and milligram per kilogram dose corresponding to each level or quantity of drug in the feed are plotted on logarithmic probability paper in order to determine $ED_{50}$ (effective dose for 50% of the animals) values. The feed, apart from the Test Drug, had an analysis of 24% minimum of crude protein, 4% minimum of crude fat, and 4.5% maximum of crude fiber. The feed contained: animal liver meal, fish meal, dried whey, corn and wheat flakes, ground yellow corn, ground oat groats, dehulled soybean meal, wheat germ meal, wheat middlings, cane molasses, dehydrated alfalfa meal, soybean oil, brewers dried yeast, vitamin A palmitate, irradiated dried yeast (source of vitamin $D_2$), riboflavin, niacin, calcium pantothenate, choline chloride. D-activated animal sterol, ⍺-tocopherol, thiamine hydrochloride, menadione sodium bisulfite (source of vitamin K activity), dicalcium phosphate, salt and traces of: manganous oxide, copper sulfate, iron carbonate, potassium iodate, cobalt sulfate and zinc oxide. The results of this test are shown in the following table wherein 10 or 15 mice were used at each level (concentration). The table also shows the ratio of dead animals at the end of the test period to total in each group by the abbreviation "Dead/Total."

| Percent level of test drug in the feed | Av. mg./kg. dose | Dead/total | (ED₅₀ average of all levels) (mg./kg.) |
|---|---|---|---|
| 0.1    | 180   | 0/15  | 54.0 |
| 0.05   | 103.8 | 1/15  |      |
| 0.025  | 56    | 10/15 |      |
| 0.0125 | 27.7  | 14/15 |      |
| 0.0063 | 14.5  | 9/10  |      |

What is claimed is:

1. A compound of the formula

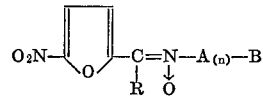

wherein $n$ is 0 or 1; A is (lower) alkylene; R is hydrogen or (lower) alkyl; and B is (a) cycloalkyl having 4 to 8 ring carbon atoms, (b) (lower) alkylcycloalkyl wherein the cycloalkyl has 4 to 8 ring carbon atoms, (c) (lower) hydroxyalkylcycloalkyl wherein the cycloalkyl has 4 to 8 ring carbon atoms, or (d) hydroxycycloalkyl having from 4 to 8 ring carbon atoms in the cycloalkyl group.

2. A compound of claim 1 wherein: $n$ is 0; R is hydrogen; and B is cycloalkyl having 4 to 8 ring carbon atoms.

3. A compound of claim 2 wherein the cycloalkyl is cyclohexyl.

4. A compound of claim 1 wherein: R is hydrogen; $n$ is 0; and B is (lower) alkylcycloalkyl wherein the cycloalkyl has 4 to 8 ring carbon atoms.

5. A compound of claim 4 wherein the cycloalkyl is cyclohexyl and the alkyl is methyl at the 2-position of said cyclohexyl group.

6. A compound of claim 1 wherein: R is hydrogen; $n$ is 0; and B is (lower) hydroxyalkylcycloalkyl having from 4 to 8 carbon atoms in the cycloalkyl ring.

7. A compound of claim 6 wherein the cycloalkyl is cyclohexyl and the hydroxy group is in the 2- or 4-position of the cyclohexyl group.

8. A compound of claim 1 wherein R is hydrogen, $n$ is 1 and B is hydroxycycloalkyl having 4 to 8 ring carbon atoms.

9. A compound of claim 8 wherein A is methylene, the cycloalkyl is cyclohexyl and the hydroxyl group is in the 1-position of said cyclohexyl group.

References Cited

Netherlands Published Application No. 640189, 20 pages and 3 drawings, published Jan. 5, 1965.

JOHN D. RANDOLPH, Primary Examiner

U.S. Cl. X.R.

424—285; 260—347.7, 563; 99—2